United States Patent
Mierzwinski

[11] Patent Number: 6,111,401
[45] Date of Patent: Aug. 29, 2000

[54] COMPACT, SELF CONTAINED, HALL-EFFECT VEHICLE SPEED SENSOR

[75] Inventor: Eugene P. Mierzwinski, Fort Wayne, Ind.

[73] Assignee: Arthur Allen Manufacturing Co., Elkhorn, Wis.

[21] Appl. No.: 09/104,442

[22] Filed: Jun. 25, 1998

[51] Int. Cl.[7] .............................. G01P 3/48; G01P 3/54; G01B 7/14; G01B 7/30; G01R 33/02
[52] U.S. Cl. ................. 324/173; 324/207.2; 324/207.25
[58] Field of Search ..................... 324/173, 174, 324/207.2, 207.21, 207.22, 207.25; 73/486, 431; 361/600; 310/68 R, 68 B

[56] References Cited

U.S. PATENT DOCUMENTS

| | | |
|---|---|---|
| 3,846,697 | 11/1974 | Cila et al. . |
| 4,465,976 | 8/1984 | Avery et al. . |
| 4,518,918 | 5/1985 | Avery . |
| 4,859,941 | 8/1989 | Higgs et al. . |
| 4,907,120 | 3/1990 | Kaczmarek et al. . |
| 4,982,155 | 1/1991 | Ramsden . |
| 4,992,731 | 2/1991 | Lorenzen . |
| 5,084,674 | 1/1992 | Lachmann et al. . |
| 5,451,868 | 9/1995 | Lock . |
| 5,609,990 | 3/1997 | Ha et al. . |

*Primary Examiner*—Walter E. Snow
*Attorney, Agent, or Firm*—Hill & Simpson

[57] ABSTRACT

A transducer is provided which produces electrical pulses whose amplitude is constant, but whose frequency varies as a function of the rotational speed of a shaft. In addition, the number of pulses per revolution can be selected at the time of assembly by changing a single component. The number of pulses per revolution can be from 1 to 45. This transducer is housed in a compact die-cast aluminum housing suitable for applications as a vehicle, and for distance measuring. The housing has first and second apertures running transverse to each other and merging with each other in the housing, the first aperture receiving a tube having an open portion and an outer peripheral wall thereof. A Hall-Effect sensor is received in the tube so that the Hall-Effect sensor is positioned adjacent the open portion of the tube. The second aperture receives a rotatable shaft having a body with sensible elements thereon, the body being positioned to lie adjacent the Hall-Effect sensor. A first support member is received in the aperture to position and rotatably support a first end of the shaft, an opposite shaft second end being received in a second support member in the second aperture. The shaft second end has a coupling mechanism to couple to a coupling member for rotationally coupling the body to a rotating member whose speed is to be determined.

17 Claims, 2 Drawing Sheets

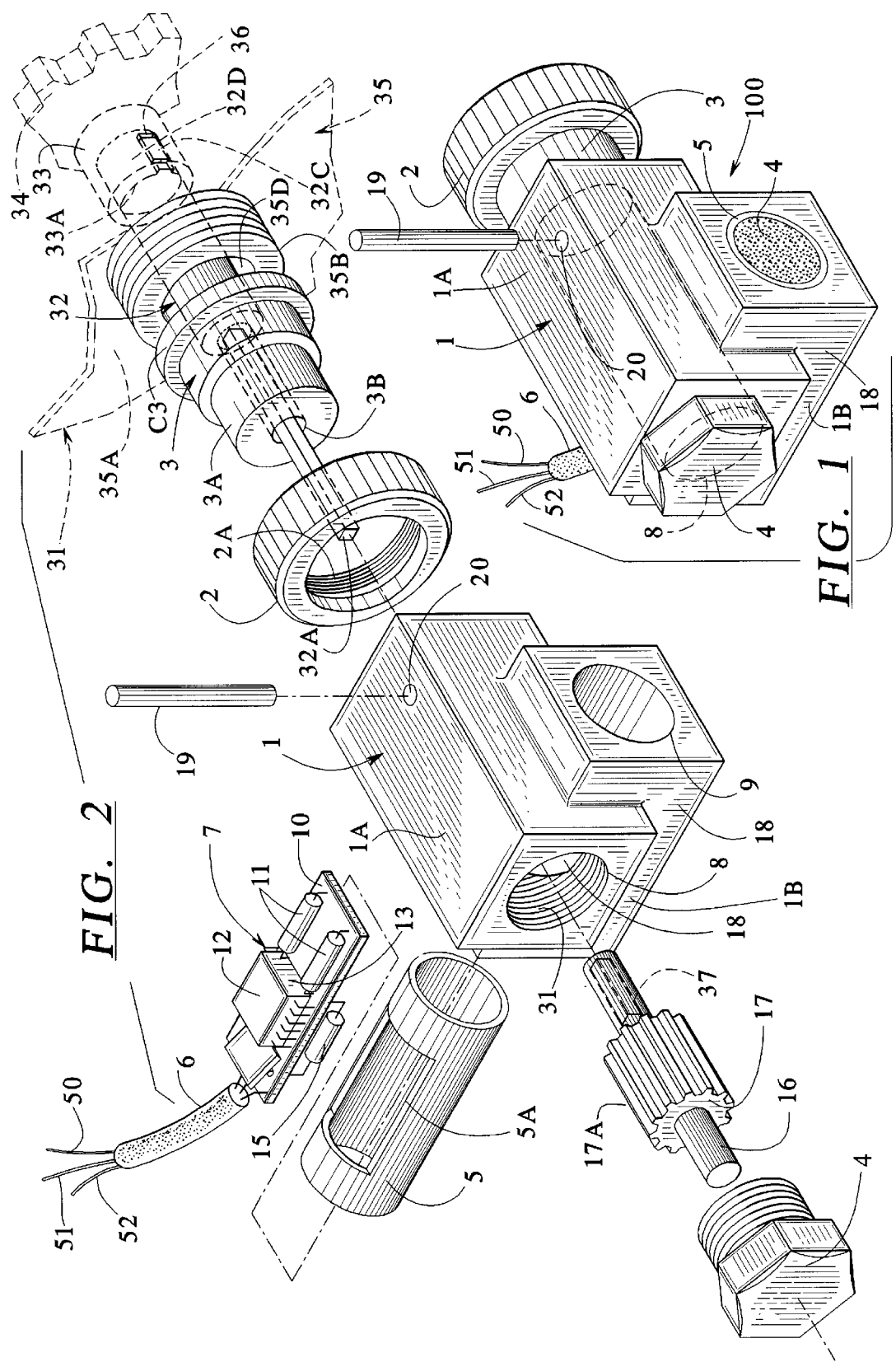

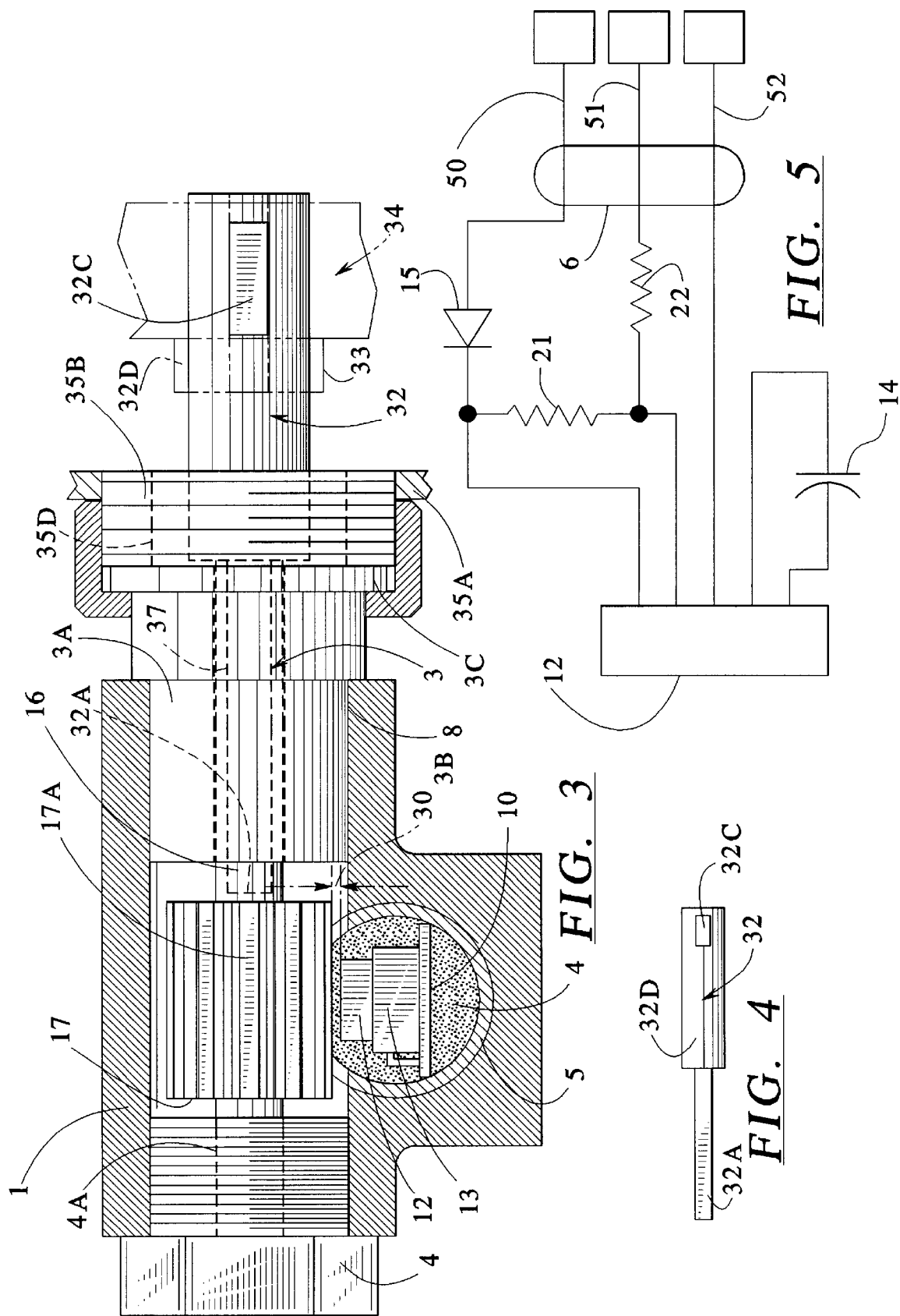

COMPACT, SELF CONTAINED, HALL-EFFECT VEHICLE SPEED SENSOR

BACKGROUND OF THE INVENTION

Three methods of determining a shaft's rotational speed are prevalent. They are: electromagnetic mini-generator; Reed switch transducer and Hall-Effect transducers. The Mini-gen-set devices are formed of a magnetic rotor surrounded by a plurality of coils each wound around a pole piece. As the rotor which is coupled to a shaft turns, a voltage is induced in each of the stator coils. These semi-sinusoidal voltages are added together and brought out as a signal which corresponds to the speed of shaft rotation.

Reed switch devices are formed of a reed switch placed in very close proximity to a rotating rotor which also contains one or more magnets. As the rotor which is coupled to a rotating shaft turns, the magnets on the rotor cause the reed switch contacts to close. When the magnet moves away from the switch, the switch contacts open. The switch contacts are usually connected to a suitable voltage source through a current limiting resistor. This results in an output signal that is essentially a square wave of constant amplitude and whose frequency is indicative of the speed of rotation of the shaft.

The third method of determining a shaft's speed of rotation is by means of a Hall-Effect transducer. This device also contains a rotor which is coupled to a shaft. Around the periphery of the rotor are individual magnets. Placed adjacent to the periphery of the rotor is a Hall-Effect sensor. A Hall-Effect device is a semiconductor material in which a current can be made to flow by placing it in a magnetic field. The stronger the field, the greater is the current flow. Placing the sensor in a field of opposite polarity will cause the current flow to cease. This current flow or lack of it is detected by appropriate circuits which are usually fabricated on the same substrate as the Hall-Effect sensing element and made available as a series of electrical pulses of constant amplitude having a frequency indicative of the rotational speed.

Each of the device types mentioned above has limitations. The mini-gen type of transducer is not completely compatible with digital electronic equipment due to its analog output signal. Furthermore, these devices do not operate satisfactorily at very low speeds. The Reed switch transducers suffer from contact bounce and have a limited mechanical life. The Hall-Effect device mentioned above is limited to the maximum number of magnetic poles that can be placed around the periphery of a rotor of a reasonable size.

SUMMARY OF THE INVENTION

It is an object of this invention to overcome size limitations of previous devices and applications while maintaining a digital output signal of constant amplitude and whose frequency only varies as a function of speed.

According to the present invention, a rotational speed sensor is provided for coupling to a rotating member whose speed is to be sensed. A housing is provided formed of first and second housing portions each having a respective aperture therethrough running perpendicular to each other and intersecting with each other to form an opening between the two apertures. The first housing portion receives in its aperture a tube having a cut-out portion at a part of an outer peripheral wall thereof. A sensor circuit assembly is provided having a Hall-Effect sensor, the assembly being received within the tube such that the Hall-Effect sensor is positioned adjacent the cut-out portion of the tube. The second housing portion aperture receives a shaft having a circular body having projections thereon. The circular body with projections is positioned to overlie the Hall-Effect sensor at the cut-out portion of the tube. A first support member is received in the second housing aperture for positioning and rotatably supporting a first end of a shaft, an opposite second end of the shaft being received in and supported by a second support member received in the second housing aperture. The shaft second end has an opening therein for receiving a coupling member for rotationally coupling the circular body to the rotating member whose speed is to be determined.

BRIEF DESCRIPTION OF THE DRAWINGS

FIG. 1 is a perspective view of the assembled vehicle speed sensor;

FIG. 2 is an exploded perspective view showing the mechanical as well as electronic components which make up the transducer;

FIG. 3 is a cutaway side view of the transducer showing the physical relationship between the Hall-Effect sensor and the gear whose teeth are sensed as they pass by the sensor;

FIG. 4 is a perspective view of a coupling member used with the invention; and

FIG. 5 is a schematic diagram which shows how the various components are interconnected.

DESCRIPTION OF THE PREFERRED EMBODIMENTS

A preferred embodiment of the side-looking sensor 100 of the invention is shown in FIG. 1. It is formed of an overall housing 1 which is die cast aluminum, however other materials could be used. Perpendicular upper and lower housing portions 1A and 1B are arranged in a mortise-tandem fashion about each rectangle center. Each rectangular housing portion 1A and 1B has a respective aperture or hole 8 or 9 through its entire length. One of the rectangular housing portions 1A has a threaded end cap 4, which supports in aperture 4A (see FIG. 3) one end of a shaft 16, to which is pressed a gear 17. The end of the rectangular housing portion 1A into which the end cap 4 is applied is internally threaded at threads 31. The end cap 4 is screwed into the housing portion 1A. To reduce friction between the shaft 16 and the end cap 4, the material from which the end cap is made is a low friction oilite. Silicone grease is also applied to each bearing surface in order to further reduce friction. The opposite side of the housing portion 1A receives the reduced diameter portion 3A of the bushing 3 having a nut 2 slidable thereover and which abuts against collar 3C. Like the end cap 4, the bushing leading end portion 3A is made to accept the shaft 16 in aperture 3B and provide a bearing surface for it to ride on. The bushing leading end portion 3A is press fitted into the housing portion 1A in aperture 8, and is then pinned through the hole 20 with the pin 19. To accomplish this, the pressed in bushing reduced diameter leading end portion 3A is drilled through in line with the hole 20.

As shown in FIG. 2, the nut 2 having threads 2A is used for mounting to a threaded collar or tube 35b having an inner aperture 35D projecting from the wall 35A of a transmission housing 35 to which the sensor 100 of the invention is being connected for speed measurement of rotating gear member 34. By use of a coupling member 32 discussed hereafter (see also FIG. 4), the shaft 16 is connected or linked to the gear or other member 34 in the transmission housing via a notch 36 in aperture 33A of gear axle 33 of gear 34 receiving the protrusion 32C of the coupling member 32. The leading end 32A of the large diameter portion 32D of the coupling member has a square cross-section and is received in a square aperture 37 in the shaft 16.

As shown in FIG. 2, inside the area where rectangular housing portions 1A and 1B overlap, there is a central cavity 18 comprising a cutout which is present at the intersection of the respective apertures 8 and 9 of the two housing portions. Thus, when the shaft 16 and gear 17 assembly is in position, the gear teeth 17A of the gear 17 protrude downwardly into the cutout portion 5A of the brass tube 5.

Again referring to FIG. 2, the aperture 9 within the lower rectangular housing portion 1B that is perpendicular to the housing portion 1A houses the electronic sensor assembly 7. This assembly 7 is formed of printed wiring board 10 on which are interconnected resistors 11, a biasing magnet 13 on top of which is the Hall-Effect sensor 12, a polarity reversal protection diode 15 and the power in/signal output cable 6. The printed wiring board and the components mounted thereon is then placed inside the brass tube 5. Potting compound 4 is then applied and the assembly is allowed to cure. Following the curing time interval, a portion of the tube 5 is ground away down to the sensor's surface to form the cutaway portion 5A, and is then pressed into the aperture 9 of housing portion 1B. The order of assembly is such that the electronic package is pressed into the housing portion 1B first, and then the mechanical components are added.

The physical relationship of the gear to the Hall-Effect sensor 12 is shown in FIG. 3. When assembled, the gap 30 between the raised portion of the gear 17 and the sensor surface is 0.015 inches.

The shaft 16 is fabricated to accept in square aperture 37 the square cross-section leading end portion 32A of the coupling member 32 at one end. This coupling member 32 is the part which couples the shaft 16 on which the gear is pressed to the driven gear 34 via large diameter portion 32D engaging in the aperture 33A of gear axle 33 as shown in the transmission housing 35. Different types of coupling members are available to couple to a variety of different kinds of driven gear terminations in the transmissions.

TRANSDUCER OPERATION

Transducer operation is as follows. As the shaft 16 is rotated by the coupling member 32, it causes the gear 17 to rotate as well. As the gear 17 rotates, the gear teeth 17A pass over the sensor 12 surface. Each time a gear tooth passes over the sensor 12, the magnetic field generated by the biasing magnet is intensified. This intensification of the magnetic field causes current to flow within the Hall-Effect material. When a gear land passes over the same point, the magnetic field intensity decreases due to the increased distance between the biasing magnet and the permeable material of the gear. The reduced intensity of the magnetic field reduces current flow within the Hall-Effect material. These changes in current flow are then detected and converted by electronic circuitry contained within the sensor package which produces a signal that is essentially a square wave of approximately 50% duty cycle, whose amplitude remains constant and whose frequency varies with the speed of rotation.

The number of pulses per revolution is determined by the number of teeth on the gear within the transducer. Using a gear with one raised area and one depressed area will result in a single pulse per revolution. Increasing the number of teeth to say 16 will provide 16 pulses per revolution. Tooth and land widths as small as 0.035 inches have been reliably detected.

CIRCUIT DESCRIPTION

FIG. 5 shows a schematic wiring diagram of the circuit used in this invention. The circuit is formed of a commercially available Hall-Effect sensor 12 made by Allegro and designated as UGN3059. It is an integrated circuit which contains the two Hall-Effect elements placed one next to the other. On the same monolithic substrate are contained signal conditioning circuitry which convert the variations in current flow into voltage pulses. The final stage of the signal conditioning circuit is an open collector transistor which requires a pull-up resistor 21 to function as a load. A separate resistor 22 is used to buffer the output circuit and prevent accidental shorting out of the output stage. A capacitor 14 is required to couple the signal generated by the first stages of the signal conditioning circuit to additional signal conditioning stages. A diode 15 is provided as protection against accidental polarity reversal of the power supply leads. Power of 5V to 28V DC is supplied through a cable 6 which contains conductor 50 to supply power to the sensor, lead 51 through which the output signal is made available, and lead 52 through which ground is supplied.

Although various minor modifications might be suggested by those skilled in the art, it should be understood that my wish to embody within the scope of the patent warranted hereon all such modifications as reasonably and properly come with the scope of my contribution to the art.

I claim as my invention:

1. A rotational speed sensor for coupling to a rotating member whose speed is to be sensed, comprising:

a housing formed of first and second housing portions each having a respective aperture therethrough running perpendicular to each other and intersecting with each other to form an opening between the two apertures, the first housing portion receiving in its aperture a tube having a cutout portion at a part of an outer peripheral wall thereof;

a sensor circuit assembly having a Hall-Effect sensor, said assembly being received within said tube such that the Hall-Effect sensor is positioned adjacent said cutout portion of said tube;

the second housing portion aperture receiving a shaft having a circular body having projections thereon sensible by said Hall-Effect sensor, said circular body with projections being positioned to overlie said Hall-Effect sensor at said cut-out portion of said tube; and a first support member received in said second housing aperture for positioning and rotatably supporting a first end of said shaft, an opposite second end of said shaft being received in and supported by a second support member received in said second housing aperture, said shaft second end having an opening therein for receiving a coupling member for rotationally coupling said circular body to said rotating member whose speed is to be determined.

2. The sensor according to claim 1 wherein said second support member comprises a bushing having a press fit portion for being received into said aperture of said second housing and also having a larger diameter portion and a stop flange receiving a nut for coupling to a device having said rotating member whose speed is to be determined.

3. The sensor according to claim 1 wherein the rotating member whose speed is to be determined is part of a transmission.

4. The sensor according to claim 1 wherein said first support member comprises an end cap having a thread received within a threaded portion of said aperture of said second housing portion and having a central aperture which receives said first end of said shaft.

5. The sensor according to claim 1 wherein the first housing portion and the second housing portion are rectangular portions.

6. The sensor according to claim 1 wherein the housing has a hole for receiving a pin which passes into at least a partial cut-out in the second support member so as to lock the second support member to the housing.

7. The sensor according to claim 1 wherein the second support member comprises a bushing having a small diameter portion and a large diameter portion with a stop flange at an end thereof.

8. The sensor according to claim 1 wherein a sensor surface of the Hall-Effect sensor lies just below a plane defined by parallel side cut edges running longitudinally of the tube at said cutout portion of the tube.

9. The sensor according to claim 1 wherein a potting compound is provided for mounting said sensor circuit assembly in said tube.

10. The sensor according to claim 1 wherein the tube comprises a brass tube.

11. The sensor according to claim 1 wherein the sensor circuit assembly comprises a Hall-Effect sensor mounted on a printed wiring board having additional circuitry receiving signals from the Hall-Effect sensor.

12. The sensor according to claim 1 wherein the sensor circuit assembly comprises a Hall-Effect sensor which is part of an integrated circuit which contains two Hall-Effect elements placed one next to the other.

13. The sensor according to claim 1 wherein the sensor circuit assembly comprises a conditioning circuit for converting variations and current flow into voltage pulses.

14. The sensor according to claim 1 wherein the sensor circuit assembly comprises a signal conditioning circuit with an open collector transistor having a pull-up resistor as a load, a separate resistor being provided to buffer an output signal and prevent accidental shorting out of an output stage, and a capacitor to couple a signal generated by the signal conditioning circuit to additional signal conditioning stages.

15. The sensor according to claim 1 wherein a diode is provided as part of said sensor circuit assembly as protection against accidental polarity reversal of power supply leads.

16. A rotational speed sensor for coupling to a rotating member whose speed is to be sensed, comprising:

a housing having first and second non-parallel apertures connecting to each other in the housing, the first aperture receiving a tube having a cutout portion at a part of an outer peripheral wall thereof;

a sensor circuit assembly having a Hall-Effect sensor, said assembly being received within said tube such that the Hall-Effect sensor is positioned adjacent said cutout portion of said tube;

the second aperture receiving a shaft having a body with sensible elements thereon, said body being positioned to lie adjacent said Hall-Effect sensor at said cut-out portion of said tube; and a first support member received in said aperture for positioning and rotatably supporting a first end of said shaft, an opposite second end of said shaft being received in and supported by a second support member received in said second aperture, said shaft second end having a coupling mechanism for coupling to a coupling member for rotationally coupling said body to said rotating member whose speed is to be determined.

17. A rotational speed sensor for coupling to a rotating member whose speed is to be sensed, comprising:

a housing having first and second apertures running transverse to each other and merging with each other in the housing, the first aperture receiving a tube having an open portion;

a sensor in said tube such that the sensor is positioned adjacent said open portion of said tube;

the second aperture receiving a rotatable shaft having a body with sensible elements thereon, said body being positioned to lie adjacent said sensor; and a first support member for positioning and rotatably supporting a first end of said shaft, an opposite second end of said shaft being received in and supported by a second support member, said shaft second end having a coupling mechanism for coupling to a coupling member for rotationally coupling said body to said rotating member whose speed is to be determined.

\* \* \* \* \*